United States Patent [19]
Wainwright et al.

[11] 3,724,641
[45] Apr. 3, 1973

[54] AUTOMATIC HOT END COATING HOOD LIFTER

[75] Inventors: Ralph E. Wainwright, Elmira; Edward R. Liston, Millport, both of N.Y.

[73] Assignee: Dart Industries Inc., Los Angeles, Calif.

[22] Filed: June 14, 1971

[21] Appl. No.: 152,940

[52] U.S. Cl....................................................198/40
[51] Int. Cl................................................B65g 43/00
[58] Field of Search...........................................198/40

[56] References Cited

UNITED STATES PATENTS 3,251,452  7/1966  Conway....................................198/40

*Primary Examiner*—Richard E. Aegerter
*Attorney*—Leigh B. Taylor et al.

[57] ABSTRACT

A device for automatically lifting a hood covering a conveyor so that an article in an improper position on the conveyor will not strike the hood. The device comprises a means for detecting an article in an improper position which activates a means for lifting the hood.

5 Claims, 5 Drawing Figures

INVENTORS
RALPH E. WAINWRIGHT
EDWARD R. LISTON
BY
Michael L. Dunn
ATTORNEY

INVENTORS.
RALPH E. WAINWRIGHT
EDWARD R. LISTON
BY Michael L. Dunn
ATTORNEY

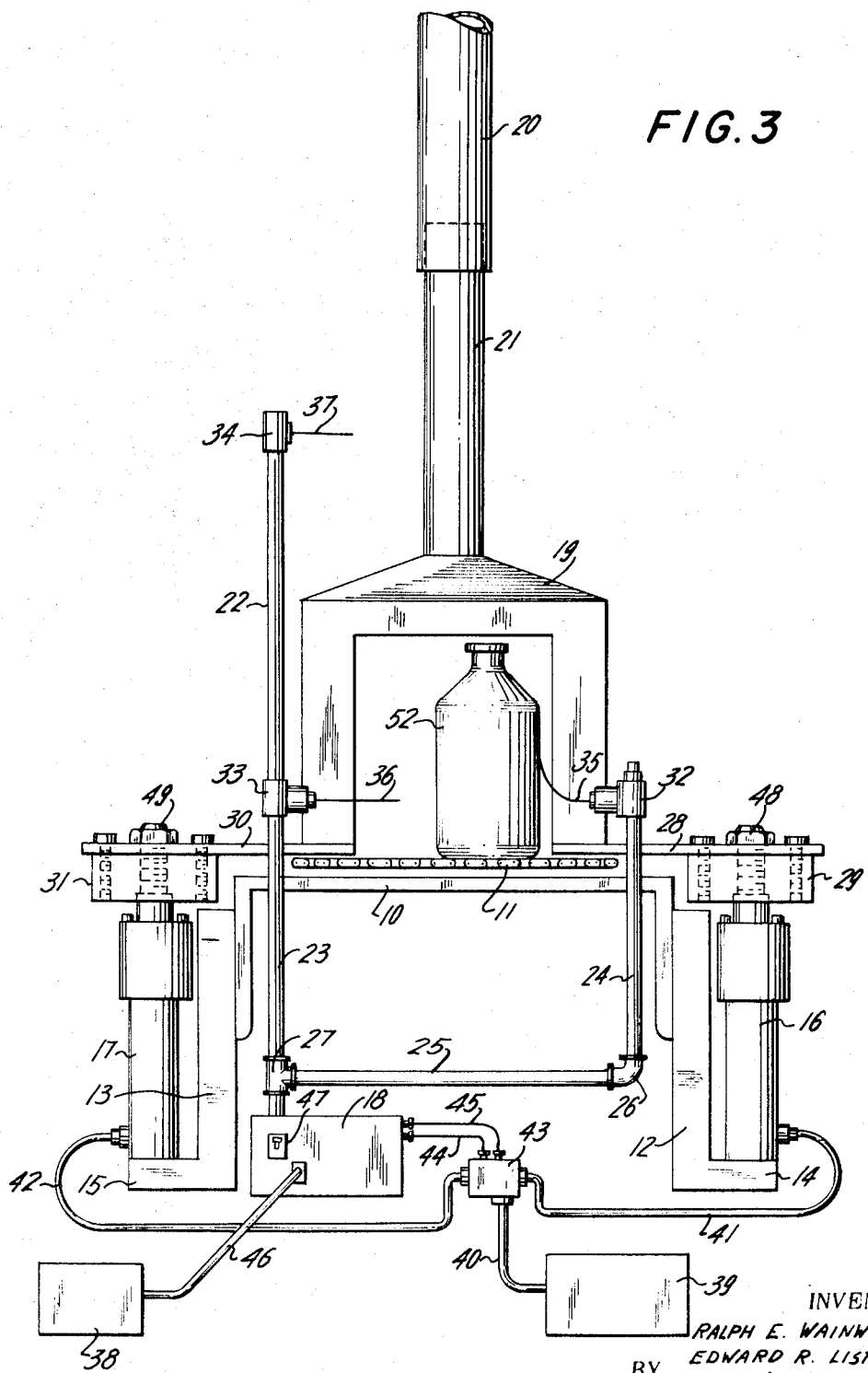

INVENTORS.
RALPH E. WAINWRIGHT
EDWARD R. LISTON
BY
Michael L. Dunn
ATTORNEY

AUTOMATIC HOT END COATING HOOD LIFTER

BACKGROUND OF THE INVENTION

1. Field of the Invention

This invention concerns an apparatus for preventing jamming or piling up of articles on a conveyor and more particularly relates to an apparatus for preventing and eliminating jamming or piling up of articles in a hood which covers the conveyor.

2. History of the Prior Art

It is known in the prior art that hoods can frequently be used over conveyors to remove unwanted gases, dispersions, dust, or heat which can be removed by air drafts or vacuums. One of the more common uses of a hood over a conveyor is to remove excess coating material or vapors from coating material from the atmosphere surrounding articles such as bottles on the conveyor which have been or are being coated.

Problems were however encountered in the prior art when hoods were placed over conveyors in that articles which became displaced with respect to their proper position on the conveyor or in other words were located at an improper position on the conveyor, would collide with the hood and become jammed in or against the hood and cause upstream articles to pile up against the jammed article. This jamming and piling up would cause time delays on the conveyor, would use valuable man hours in clearing the jam and would frequently cause damage to articles such as glass bottles on the conveyor.

Recently, the problem has been slightly alleviated by providing means for lifting the hood to assist in clearing the jam, thus reducing the amount of time required to clear the jam. By providing means for raising the hood time delays were not eliminated but were reduced; and it was necessary to have a man watching the articles so that he could raise the hood when the articles began to jam in or against the hood. In addition, damage to the articles continued to result.

BRIEF DESCRIPTION OF THE INVENTION

In order to substantially reduce or eliminate the problem of jamming and piling up of articles against the hood, a device has been invented for automatically lifting the hood covering the conveyor when an article on the conveyor becomes displaced with respect to its proper orientation on the conveyor. A proper orientation or position is one which would permit the article to pass through the hood without striking any portion of the hood whereas an improper orientation or position of an article would permit the article to strike a portion of the hood if the hood were not moved from the path of the displaced article in the improper orientation or position. The device comprises a means for detecting the displacement or improper position of the article and a means for lifting the hood. The detecting means is connected to the lifting means so that when a displaced article is detected the lifting means is activated raising the hood out of the path of the article thus preventing the article from striking the hood, jamming and causing upstream articles to pile up against the jammed article. The apparatus thus almost completely eliminated time delays, loss of man hours clearing the jam and damage to articles on the conveyor.

The apparatus or device may also include a second detecting means for detecting when the hood has been lifted for a sufficient time period. The second detecting means is connected to the lifting means and deactivates the lifting means, when a sufficient period has elapsed to permit the displaced article to pass, so that the hood will return to a position covering the conveyor.

BRIEF DESCRIPTION OF THE DRAWINGS

FIG. 3 is the front plan view of FIG. 1 except an article is shown displaced to the right.

PREFERRED EMBODIMENT

Figure 1:
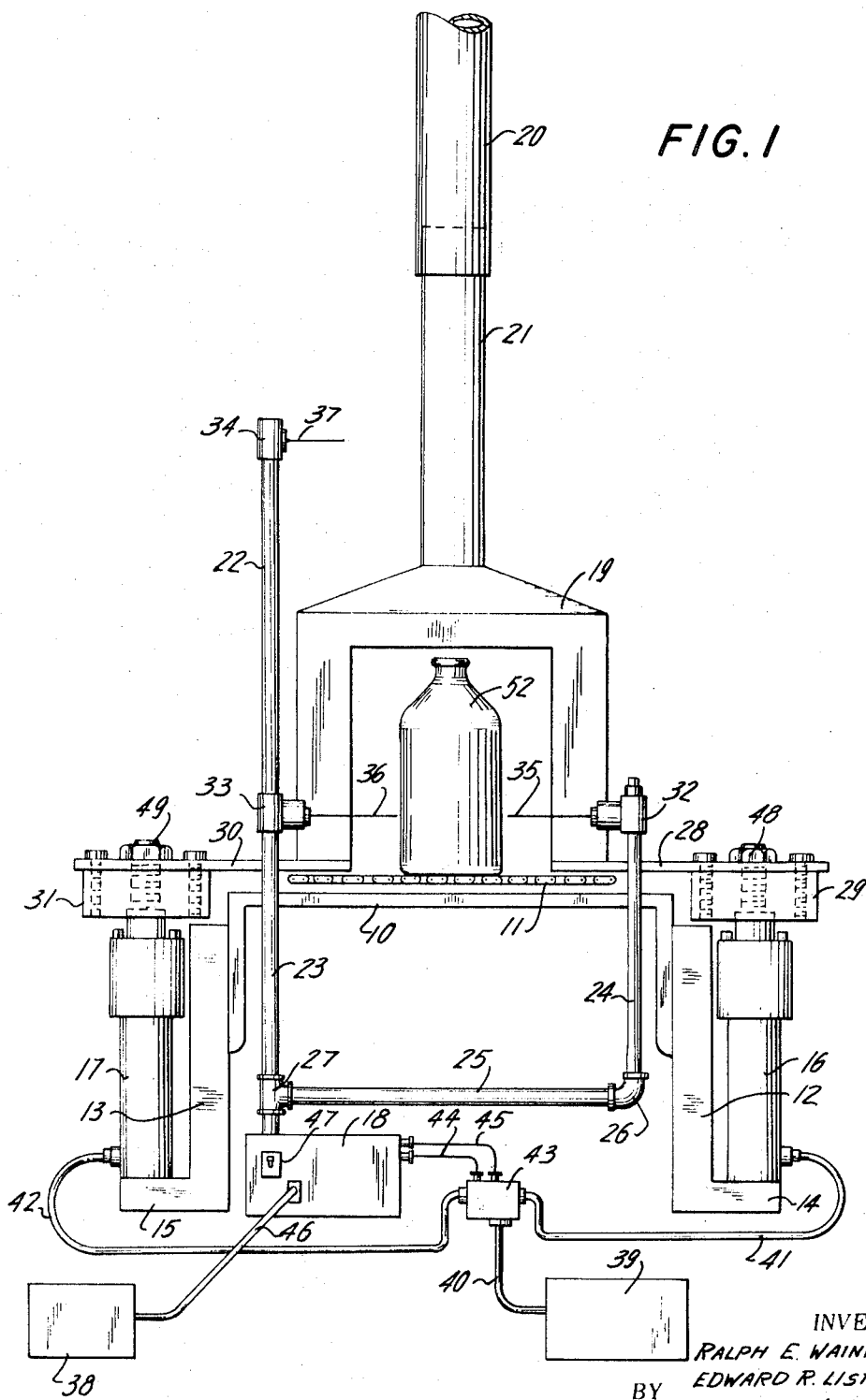
FIG. 1 is a front plan view of the apparatus of the preferred embodiment.
Figure 2:
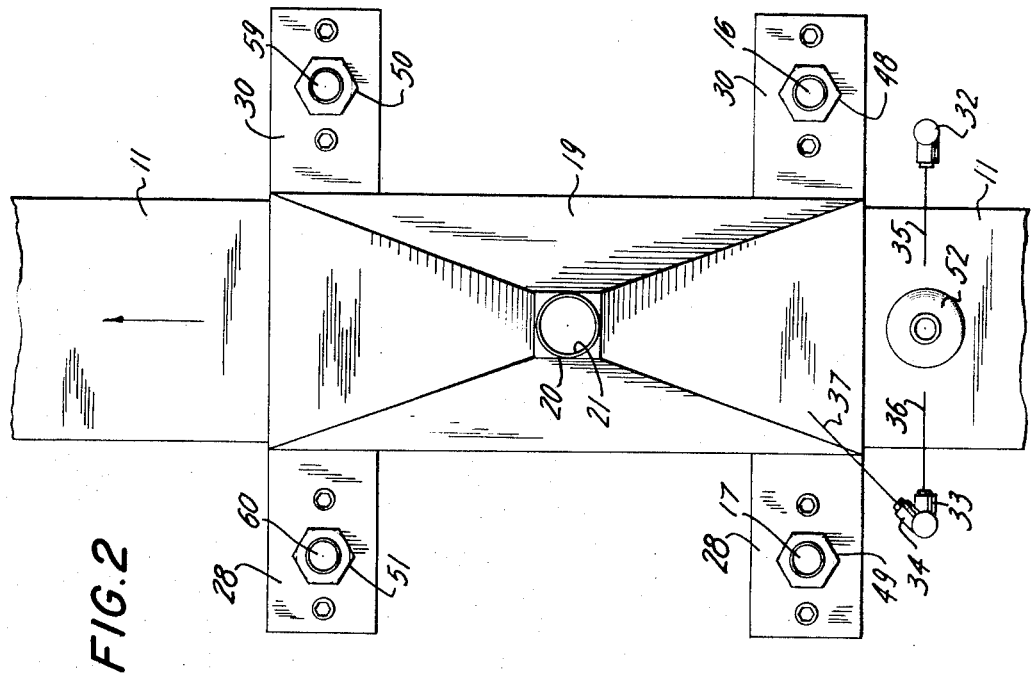
FIG. 2 is a top plan view of the apparatus of the preferred embodiment.
Figure 4:
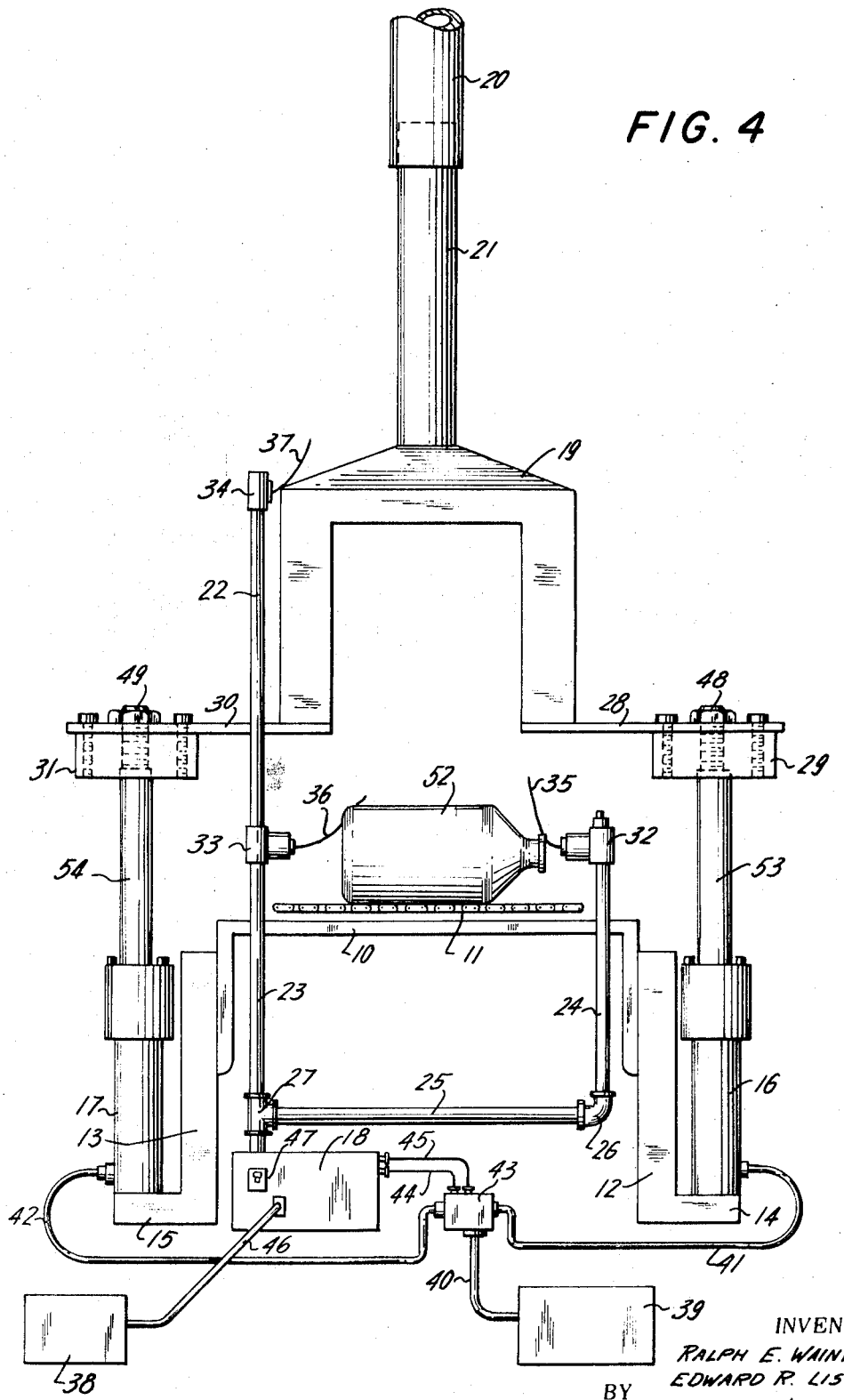
FIG. 4 is the front plan view of FIG. 1 except an article is shown in an improper orientation and the hood is shown in the raised or lifted position.

Referring now to the drawings which illustrate the preferred embodiment of the invention, as best seen in FIGS. 1, 3 and 4. Conveyor frame 10 is secured by any suitable means to mounts 12 and 13. Frame 10 is likewise secured to two additional mounts obscured by mounts 12 and 13 and are therefore not shown. Each of the mounts is supported by a foot, and as seen in FIGS. 1, 3 and 4 mount 12 is supported by foot 14 and mount 13 is supported by foot 15. Conveyor 11 is supported by frame 10 and travels in the direction indicated by the arrow shown in FIG. 2. As seen in FIGS. 1 through 4, hood 19 covers a portion of conveyor 11 and is supported by hood frames 28 and 30. Hood 19 is provided with a vent stack 21 which in the preferred embodiment slides into sleeve 20. Preferably hood frames 28 and 30 are mounted upon four air cylinders by means of air cylinder mounts. Two of these cylinders 16 and 17 with their respective mounts 29 and 31 are clearly shown in FIGS. 1, 3 and 4. FIG. 2 shows the tops of all four cylinders 16, 17, 59 and 60 secured to hood frames 28 and 30 by means of cylinder nuts 48, 49, 50 and 51 respectively.

As best seen in FIGS. 1, 3 and 4, the device of the preferred embodiment is provided with microswitches 32, 33 and 34 which are provided with feelers 35, 36 and 37 respectively. These microswitches with their respective feelers act as the initial detecting means in the preferred embodiment. Other detecting means such as photocells can of course be used; however, photocells were found less satisfactory when the hood was used as a hood covering a hot end vapor coating operation on glassware. In this particular operation, photocells became coated with vapor, could not withstand the high temperatures and were affected by ambient light.

Microswitch 32 is supported by pipe support 24, elbow 26, pipe support 25 and tee 27 in a position so that an article 52 in an improper position to the right side of the conveyor, as seen in FIGS. 3 and 4 will strike feeler 35 and activate microswitch 32.

Microswitch 33 is similarly supported by pipe support 23 and tee 27 to detect improper article position on the left of the conveyor as seen in FIG. 4. A further pipe support 22 is connected at one end to microswitch 33 and at the other end to microswitch 34 so that microswitch 34 and its feeler 37 are supported in a position which will cause the hood to strike feeler 37 and activate microswitch 34 when the hood is in the raised position as shown in FIG. 4.

Wiring for each of the microswitches passes through their respective pipe supports to electrical box 18 which is in turn connected to power supply 38 by means of power supply wire 46. Electrical box 18 is likewise connected to solenoid valve 43 by means of solenoid wires 44 and 45 so that when either microswitch 32 or 33 is activated solenoid valve 43 will be opened by means of a relay 55 located in electrical box 18. Solenoid valve 43 is connected by means of main air conduit 40 to air supply 39 so that when solenoid valve 43 is opened, air passes through secondary conduits to each of the air cylinders thus raising each of the pistons in the cylinders which in turn raises the hood. Connections from solenoid valve 43 to two of the cylinders 16 and 17 can be seen in FIGS. 1, 3 and 4. Solenoid valve 43 is connected to cylinder 16 by means of secondary air conduit 41 and to cylinder 17 by means of secondary air conduit 42. Valve 43 is likewise connected to cylinders 59 and 60 by means of secondary air conduits not shown.

When valve 43 is opened all pistons in cylinders 16, 17, 59 and 60 will be in the raised position. Pistons 53 and 54 can be seen in the raised position in FIG. 4.

When hood 19 is in the raised position, feeler 37 will be contacted by hood 19, thus activating microswitch 34 which in turn closes solenoid valve 43 through electrical box 18. When valve 43 is closed, no further air enters cylinders 16, 17, 59 and 60 and the air trapped in the cylinders leaks past each of their respective pistons thus permitting the hood to slowly fall back into its position covering the conveyor. A small hole may be provided through each piston to assist in releasing trapped air. It has been found that sufficient time passes between the time the hood raises and the time it returns to its normal position to permit the displaced bottle or other article 52 to pass under the hood.

Figure 5:
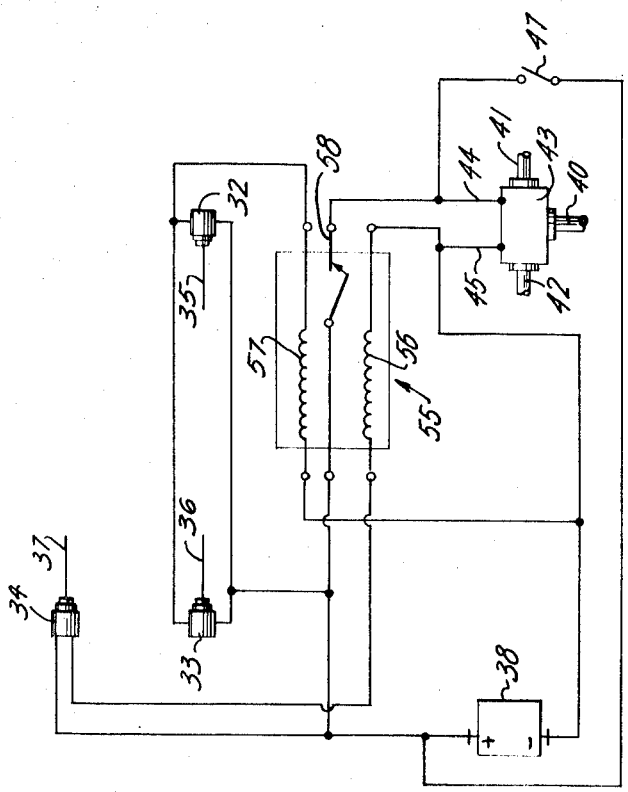
FIG. 5 shows a wiring diagram to illustrate the interconnection and operation of the detecting means of the preferred embodiment with respect to the lifting means of the preferred embodiment.

In order to clearly understand the electrical operation of the device, reference should be had to FIG. 5. Microswitches 32 and 33 are hooked in parallel to each other across relay coil 57 so that when either switch 32 or 33 is activated by a displaced article, coil 57 is likewise activated. When coil 57 is activated, latching relay switch 58 is closed. Relay switch 58 is hooked in series with power supply 38 and solenoid valve 43 so that when latching relay switch 58 is closed, solenoid valve 43 will open causing hood 19 to lift as previously discussed. When hood 19 reaches its raised position, it will activate microswitch 34 which is hooked in series with release coil 56 which opens relay switch 58 which in turn closes solenoid valve 43 which permits the hood to lower to its position covering the conveyor. For convenience by-pass switch 47 is provided in series with power supply 38 and valve 43 to by-pass microswitches 32 and 33. The hood may therefore be raised without activating switches 32 or 33 by closing switch 47 which in turn activates valve 43 which raises hood 19 as previously discussed.

Any means for raising the hood is of course suitable, mechanical rather than hydraulic devices can for example be activated by the above detection circuit.

The above device has been found extremely effective in reducing the number of jams of articles occuring under or against a hood covering a conveyor. The unit has been operated experimentally for periods in excess of one week without a single jam or backup of articles against the hood.

What is claimed is:

1. A device for automatically lifting a hood covering at least a portion of a conveyor when an article on the conveyor becomes displaced with respect to its proper orientation on the conveyor which displacement would cause the article to strike a portion of the hood if the hood were not moved from the path of the displaced article, said device comprising a hood covering at least a portion of a conveyor, means for detecting improper displacement of an article on said conveyor, and means for lifting said hood, said detecting means being connected to said lifting means so that when said detecting means detects that an article is displaced, said lifting means is activated to lift said hood thus permitting said displaced article to pass beneath said lifted hood, said device further comprising a second detecting means for detecting when said hood has been lifted to permit the displaced article to pass, said second detecting means being connected to and deactivating said lifting means.

2. A device for automatically lifting a hood covering at least a portion of a conveyor when an article is located at an improper position upon said conveyor which would cause said article to strike said hood unless said hood were removed from the path of travel of said article, said device comprising a hood covering at least a portion of a conveyor, first detecting means for detecting an article in improper position, means for raising said hood, and a second detecting means for detecting when said hood has been raised, said first detecting means being connected to said raising means to activate said raising means when said first detecting means detects an article in said improper position, said second detecting means being connected to said raising means to deactivate said raising means when said second detecting means detects that said hood has been raised so that said hood will return to a position over said conveyor, said first detecting means comprising: at least one microswitch; a feeler connected to said microswitch and extending over said improper position upon said conveyor so that when said feeler is contacted by an article located in said improper position said microswitch will be activated; a latching relay having an activating coil and latching relay switch, said activating coil being connected to said microswitch xo that when said microswitch is activated, said activating coil will be energized closing said latching relay switch, said relay switch being connected to and activating said raising means when said relay switch is closed.

3. The device claimed in claim 2 wherein said second detecting means comprises a secondary microswitch; a feeler connected to said secondary microswitch and extending above said hood so that when said hood is in the raised position said hood will contact said feeler connected to said secondary microswitch thus activating said secondary microswitch; a deactivating coil in said latching relay connected to said microswitch so that when said secondary microswitch is activated said deactivating coil will be energized thus opening said latching relay switch which deactivates said raising means permitting said hood to return to a position over said conveyor.

4. A device for automatically lifting a hood covering at least a portion of a conveyor when an article on the conveyor becomes displaced with respect to its proper orientation on the conveyor which displacement would cause the article to strike a portion of the hood if the hood were not moved from the path of the displaced article, said device comprising conveying means, hood means over at least a portion of said conveying means, means for detecting an article in improper position on said conveyor means and means for lifting said hood, said detecting means being connected to said lifting means so that when said detecting means detects that an article is in improper position on said conveyor said lifting means is activated to lift said hood thus permitting said displaced article to pass on said conveyor beneath said lifted hood, said lifting means comprising at least one air cylinder connected to said hood so that activation of said air cylinder raises and lowers said hood, said air cylinder being connected to a solenoid valve which in turn is connected to said detecting means so that said solenoid valve is opened by said detecting means which permits compressed air to pass through said solenoid valve to said air cylinder which raises said hood.

5. A device for automatically lifting a hood above a conveyor to prevent displaced articles travelling on said conveyor from contacting said hood comprising:
   conveyor means for transporting articles,
   hood means covering at least a portion of said conveyor means,
   lifting means to raise said hood out of contact with displaced articles,
   means to detect displaced articles on said conveyor means and to activate said lifting means, and
   means to deactivate said lifting means.

* * * * *